United States Patent
Fukuda (10) Patent No.: US 10,123,160 B2
(45) Date of Patent: Nov. 6, 2018

(54) COMMUNICATION APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Atsushi Fukuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/649,002

(22) Filed: Jul. 13, 2017

(65) Prior Publication Data

US 2018/0020322 A1 Jan. 18, 2018

(30) Foreign Application Priority Data

Jul. 15, 2016 (JP) .................................. 2016-140805

(51) Int. Cl.
| | |
|---|---|
| H04B 7/00 | (2006.01) |
| H04W 4/02 | (2018.01) |
| H04W 4/00 | (2018.01) |
| G06T 7/70 | (2017.01) |
| H04N 7/18 | (2006.01) |
| H04W 4/80 | (2018.01) |
| G03B 13/36 | (2006.01) |
| H04N 5/232 | (2006.01) |

(52) U.S. Cl.
CPC ................. *H04W 4/02* (2013.01); *G06T 7/70* (2017.01); *H04N 7/183* (2013.01); *H04W 4/008* (2013.01); *H04W 4/80* (2018.02); *G03B 13/36* (2013.01); *H04N 5/23212* (2013.01)

(58) Field of Classification Search
CPC ......... H04W 4/02; H04W 4/80; H04W 4/008; G06T 7/70; H04N 7/183
USPC ................................................ 455/41.2, 41.3
See application file for complete search history.

(56) References Cited

U.S. PATENT DOCUMENTS

| | | | | |
|---|---|---|---|---|
| 9,814,091 B2* | 11/2017 | Takemura | ............. | H04W 76/38 |
| 2014/0056224 A1* | 2/2014 | Rubin | ................ | H04W 28/021 370/328 |

FOREIGN PATENT DOCUMENTS

| | | |
|---|---|---|
| JP | 2015-012582 A | 1/2015 |
| JP | 2017107495 | * 12/2015 |

* cited by examiner

*Primary Examiner* — Raj Chakraborty
(74) *Attorney, Agent, or Firm* — Cowan, Liebowitz & Latman, P.C.

(57) ABSTRACT

There is provided a communication apparatus including a first communication unit and a second communication unit. An acquiring unit acquires, while a first connection with a positioning apparatus is established via the first communication unit, position information from the positioning apparatus via the first connection. A storing unit stores the acquired position information in a memory. A switching unit executes, in response to an instruction to switch connection, processing for disconnecting the first connection and processing for establishing a second connection with the positioning apparatus via the second communication unit. A deleting unit deletes the position information from the memory in response to the first connection being disconnected, wherein the deleting unit does not delete the position information when the disconnection is due to the instruction to switch connection.

10 Claims, 5 Drawing Sheets

COMMUNICATION APPARATUS, IMAGE CAPTURING APPARATUS, CONTROL METHOD, AND STORAGE MEDIUM

BACKGROUND OF THE INVENTION

Field of the Invention

The present invention relates to a communication apparatus, an image capturing apparatus, a control method, and a storage medium.

Description of the Related Art

Currently, image capturing apparatuses having a GPS function that can add position information to an image when the image is shot are widely spread. The shooting point, the movement locus, and the like can be displayed along with an image using the position information that has been added to the image.

Also, image capturing apparatuses having a communication function of communicating with a positioning apparatus are known. For example, a technique is disclosed in Japanese Patent Laid-Open No. 2015-012582 in which an image capturing apparatus performs communication with a positioning apparatus having a GPS function when an image is shot, receives position information acquired by the positioning apparatus, and associates the image with the received position information. According to such a configuration, position information can be added to a captured image in an image capturing apparatus that does not have a GPS function as well.

According to the technique disclosed in Japanese Patent Laid-Open No. 2015-012582, an image capturing apparatus cannot add position information to an image when the connection between the image capturing apparatus and a positioning apparatus is disconnected. In this regard, it is conceivable that, when the connection between the image capturing apparatus and the positioning apparatus is disconnected, the addition of position information to an image is made possible by using position information that the image capturing apparatus has received in the past.

However, the position information that the image capturing apparatus has received in the past does not necessarily appropriately correspond to the current position (when the image is shot) of the image capturing apparatus. Here, the connection between the image capturing apparatus and the positioning apparatus can be disconnected due to various causes. For example, when the image capturing apparatus is separated from the positioning apparatus and moved outside the communicable range, the connection is disconnected. In this case, it is highly possible that the position information that the image capturing apparatus received in the past is no longer valid (does not appropriately correspond to the position of the image capturing apparatus). Other examples include a case where a first connection between the image capturing apparatus and the positioning apparatus that is connected via a specific communication interface is disconnected in order to switch to a second connection via another communication interface. In this case, the image capturing apparatus and the positioning apparatus still exist within a short distance (communicable distance) even after the first connection is disconnected. Accordingly, it is highly possible that the position information that the image capturing apparatus received in the past is still valid (appropriate as information that indicates the position of the image capturing apparatus).

In this way, when the connection between the communication apparatus (such as an image capturing apparatus having a communication function) and the positioning apparatus is disconnected, the validity of the position information that the communication apparatus acquired from the positioning apparatus in the past is influenced by the cause of the disconnection. However, conventionally, it is not known that the position information is handled in consideration of the cause of disconnection.

SUMMARY OF THE INVENTION

The present invention has been made in view of the above-mentioned circumstances, and provide a technique in which, in a communication apparatus that can acquire position information from a positioning apparatus, position information that was acquired in the past is appropriately handled when a communication connection for acquiring the position information is disconnected.

According to a first aspect of the present invention, there is provided a communication apparatus including a first communication unit and a second communication unit, comprising: an acquiring unit configured to acquire, while a first connection with a positioning apparatus is established via the first communication unit, position information from the positioning apparatus via the first connection; a storing unit configured to store the acquired position information in a memory; a switching unit configured to execute, in response to an instruction to switch connection, processing for disconnecting the first connection and processing for establishing a second connection with the positioning apparatus via the second communication unit; and a deleting unit configured to delete the position information from the memory in response to the first connection being disconnected, wherein the deleting unit does not delete the position information when the disconnection is due to the instruction to switch connection.

According to a second aspect of the present invention, there is provided an image capturing apparatus including a first communication unit and a second communication unit, comprising: an acquiring unit configured to acquire, while a first connection with a positioning apparatus is established via the first communication unit, position information from the positioning apparatus via the first connection; a storing unit configured to store the acquired position information in a memory; a switching unit configured to execute, in response to an instruction to switch connection, processing for disconnecting the first connection and processing for establishing a second connection with the positioning apparatus via the second communication unit; a deleting unit configured to delete the position information from the memory in response to the first connection being disconnected, wherein the deleting unit does not delete the position information when the disconnection is due to the instruction to switch connection; and an image capturing unit.

According to a third aspect of the present invention, there is provided a control method executed by a communication apparatus including a first communication unit and a second communication unit, comprising: acquiring, while a first connection with a positioning apparatus is established via the first communication unit, position information from the positioning apparatus via the first connection; storing the acquired position information in a memory; executing, in response to an instruction to switch connection, processing for disconnecting the first connection and processing for establishing a second connection with the positioning apparatus via the second communication unit; and deleting the position information from the memory in response to the first connection being disconnected, wherein the position information is not deleted when the disconnection is due to the instruction to switch connection.

According to a fourth aspect of the present invention, there is provided a non-transitory computer-readable storage medium which stores a program for causing a computer of a communication apparatus to execute a control method, the communication apparatus including a first communication unit and a second communication unit, the control method comprising: acquiring, while a first connection with a positioning apparatus is established via the first communication unit, position information from the positioning apparatus via the first connection; storing the acquired position information in a memory; executing, in response to an instruction to switch connection, processing for disconnecting the first connection and processing for establishing a second connection with the positioning apparatus via the second communication unit; and deleting the position information from the memory in response to the first connection being disconnected, wherein the position information is not deleted when the disconnection is due to the instruction to switch connection.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
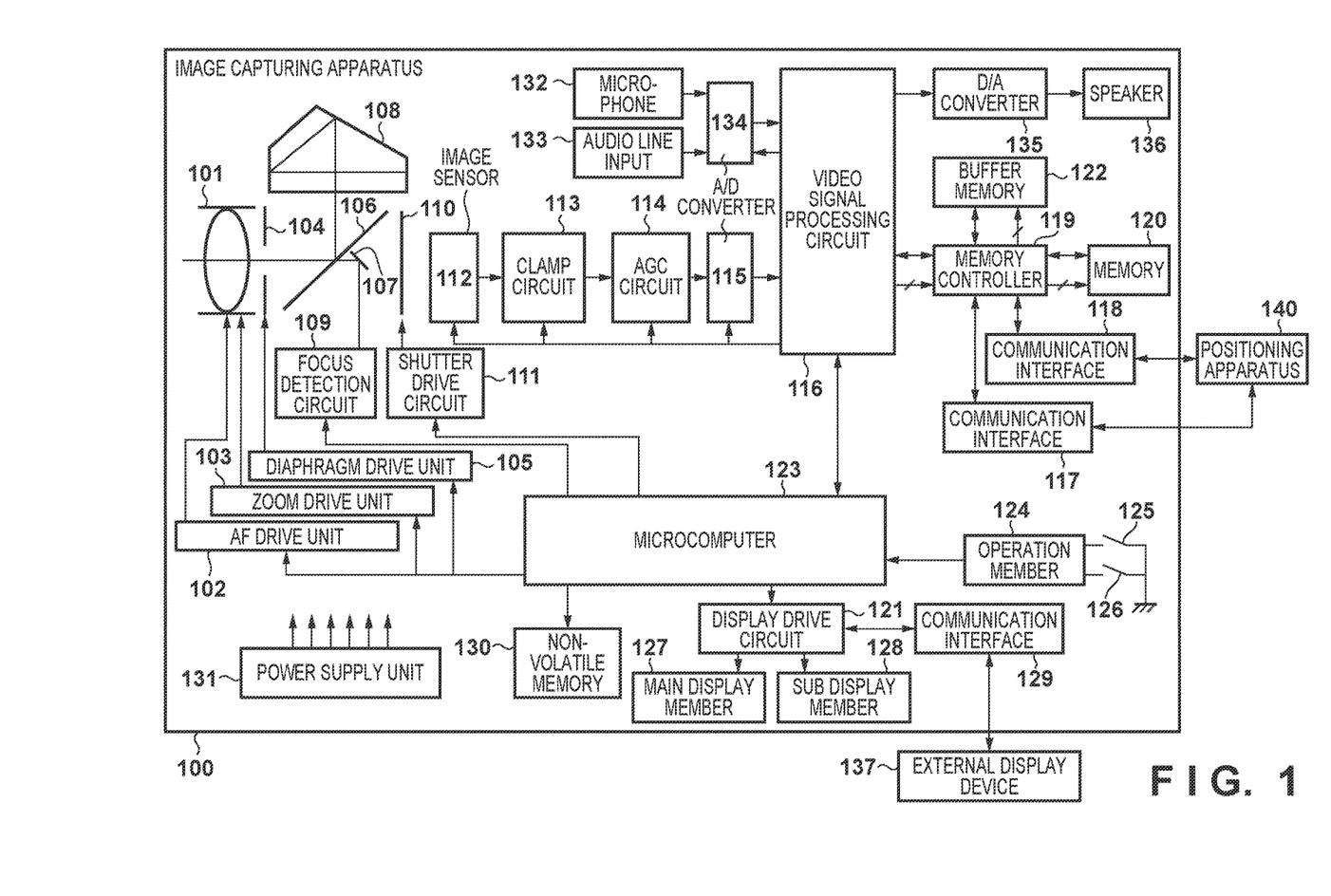
FIG. 1 is a block diagram illustrating a configuration of an image capturing apparatus 100, which is an example of a communication apparatus.

FIG. 1 is a block diagram illustrating a configuration of an image capturing apparatus 100, which is an example of a communication apparatus. The image capturing apparatus 100 includes a photographing lens 101 and an AF drive unit 102 (autofocus drive unit). The AF drive unit 102 is constituted by a DC motor or a stepping motor, for example, and adjusts focus by changing the focusing lens position of the photographing lens 101 under control of a microcomputer 123. A zoom drive unit 103 is constituted by a DC motor or a stepping motor, for example, and changes the focal distance of the photographing lens 101 by changing the magnification lens position of the photographing lens 101 under control of the microcomputer 123. The image capturing apparatus 100 includes a diaphragm 104. A diaphragm drive unit 105 drives the diaphragm 104. The drive amount is calculated by the microcomputer 123, and the optical aperture value is changed accordingly.

A main mirror 106 switches the guiding direction of a light beam that is incident from the photographing lens 101 between a finder side and an image sensor side. The main mirror 106 is normally arranged to reflect the light beam such that the light beam is guided to the finder side. When shooting is performed, the main mirror 106 flips upward such that the light beam is guided to an image sensor 112. A central portion of the main mirror 106 is a half mirror through which some light can pass, and therefore, the main mirror 106 allows some of the light beam to pass through so as to be incident on a focus detection sensor. A sub mirror 107 reflects the light beam that has passed through the main mirror 106 so as to be guided to the focus detection sensor (that is arranged in a focus detection circuit 109).

A pentaprism 108 constitutes the finder. The finder is constituted by a focusing screen (unshown), an eyepiece lens (unshown), and the like, in addition to the pentaprism 108. The image capturing apparatus 100 includes the focus detection circuit 109. The light beam that passed through the central portion of the main mirror 106 and has been reflected by the sub mirror 107 reaches a sensor that performs photoelectric conversion and is arranged in the focus detection circuit 109. The defocus amount used for focus calculation is obtained by performing calculation using the output from the sensor. The microcomputer 123 evaluates the calculation result, and instructs an AF drive unit 102 to drive the focus lens.

The image capturing apparatus 100 includes a focal-plane shutter 110. A shutter drive circuit 111 drives the focal-plane shutter 110. The open period of the shutter is controlled by the microcomputer 123.

The image sensor 112 converts an object image formed by the photographing lens 101 into an electrical signal. A CCD or CMOS sensor or the like is used for the image sensor 112. The image capturing apparatus 100 includes a clamp circuit 113 and an AGC circuit 114. The clamp circuit 113 and the AGC circuit 114 perform basic analog signal processing before A/D conversion is performed. The microcomputer 123 changes the clamp level and the AGC reference level. An A/D converter 115 converts an analog output signal of the image sensor 112 into a digital signal. A video signal processing circuit 116 is realized by a logic device such as a gate array.

Communication interfaces 117 and 118 are each a communication interface that conforms to USB, WiFi, Bluetooth (registered trademark), Bluetooth Low Energy (BLE), or the like, and communicate with a positioning apparatus 140. The number of communication interfaces for performing communication with the positioning apparatus 140 is two in FIG. 1, but the number thereof may be any number that is two or more.

The image capturing apparatus 100 includes a memory controller 119 and a memory 120. The memory 120 may be detachable. A display drive circuit 121 drives a main display member 127 and a sub display member 128 according to the display command of the microcomputer 123. Also, a back light (unshown) such as an LED is arranged in the sub display member 128, and the back light is driven by the display drive circuit 121 as well. The microcomputer 123 displays photographing information (such as aperture, shutter speed, ISO speed) that is set before shooting is performed and a wireless communication setting in the main display member 127 and the sub display member 128, and in an external display device 137 as well as necessary. The image capturing apparatus 100 includes a buffer memory 122.

The video signal processing circuit 116 performs compression processing such as JPEG along with filter processing, color conversion processing, and gamma processing on digitized image data, and outputs the result to the memory controller 119. The video signal processing circuit 116 performs compression processing on an audio signal from a microphone 132 or an audio line input 133, and outputs the result to the memory controller 119. The video signal processing circuit 116 can also output the video signal from the image sensor 112 and the image data that is reversely input from the memory controller 119 to the main display member 127, the sub display member 128, and the external display device 137 via the display drive circuit 121. These types of function switches are performed according to the instructions from the microcomputer 123. The video signal processing circuit 116 can output pieces of information such as exposure information and white balance of the signal of the image sensor 112 to the microcomputer 123 as necessary. The microcomputer 123 instructs white balance adjustment and gain adjustment based on these pieces of information. In the case of a continuous shooting operation, the photographing data in a state of an unprocessed image is temporarily stored in the buffer memory 122. The video signal processing circuit 116 reads out the unprocessed image via the memory controller 119, and performs image processing and compression processing thereon. The video signal processing circuit 116 can output the audio data received from the microphone 132 or the audio line input 133 to a speaker 136 via a D/A converter 135 as well.

The memory controller 119 stores unprocessed digital images and audio data that are input from the video signal processing circuit 116 in the buffer memory 122, and stores processed digital images and audio data in the memory 120. Also, conversely, the memory controller 119 reads out images and audio data from the buffer memory 122 and the memory 120 and outputs them to the video signal processing circuit 116. The memory controller 119 can output images and audio data stored in the memory 120 to the positioning apparatus 140 via the communication interfaces 117 and 118. Alternatively, the memory controller 119 can store data transmitted from the positioning apparatus 140 in the memory 120 via the communication interfaces 117 and 118 as well.

An operation member 124 notifies the microcomputer 123 of the state thereof, and the microcomputer 123 controls the units of the image capturing apparatus 100 according to the change in the state of the operation member 124. The image capturing apparatus 100 includes a switch 1 125 (switch SW1) and a switch 2 126 (switch SW2). The switch SW1 and the switch SW2 are switches that are turned on and off according to the operation of a release button, and are each an input switch of the operation member 124. The state in which only the switch SW1 is turned on is a state in which the release button is pressed halfway. In this state, an autofocus operation and a photometry operation are performed. The state in which both the switches SW1 and SW2 are turned on is a state in which the release button is fully pressed, and a release button on-state in which an image is recorded. Shooting is performed in this state. Also, a continuous shooting operation is performed while the switches SW1 and SW2 are turned on. In addition, switches (unshown) corresponding to an ISO setting button, and image size setting button, an image quality setting button, an information display button, and the like are connected to the operation member 124, and the states of the switches are detected.

A communication interface 129 is a communication interface that can connect to the external display device 137. A nonvolatile memory 130 (EEPROM) can retain data even in a state in which power is not supplied to the image capturing apparatus 100. The power supply unit 131 supplies the necessary power to the units of the image capturing apparatus 100. The A/D converter 134 converts an analog output signal of the microphone 132 or the audio line input 133 into a digital signal. The D/A converter 135 converts a digital signal into an analog output signal. The external display device 137 is a display, for example.

The positioning apparatus 140 is an apparatus that has a positioning function such as GPS, and is a computer, a mobile phone, or a mobile information terminal, for example. The image capturing apparatus 100 can transmit and receive various types of information and image data to and from the positioning apparatus 140 via the communication interfaces 117 and 118.

Figure 2:
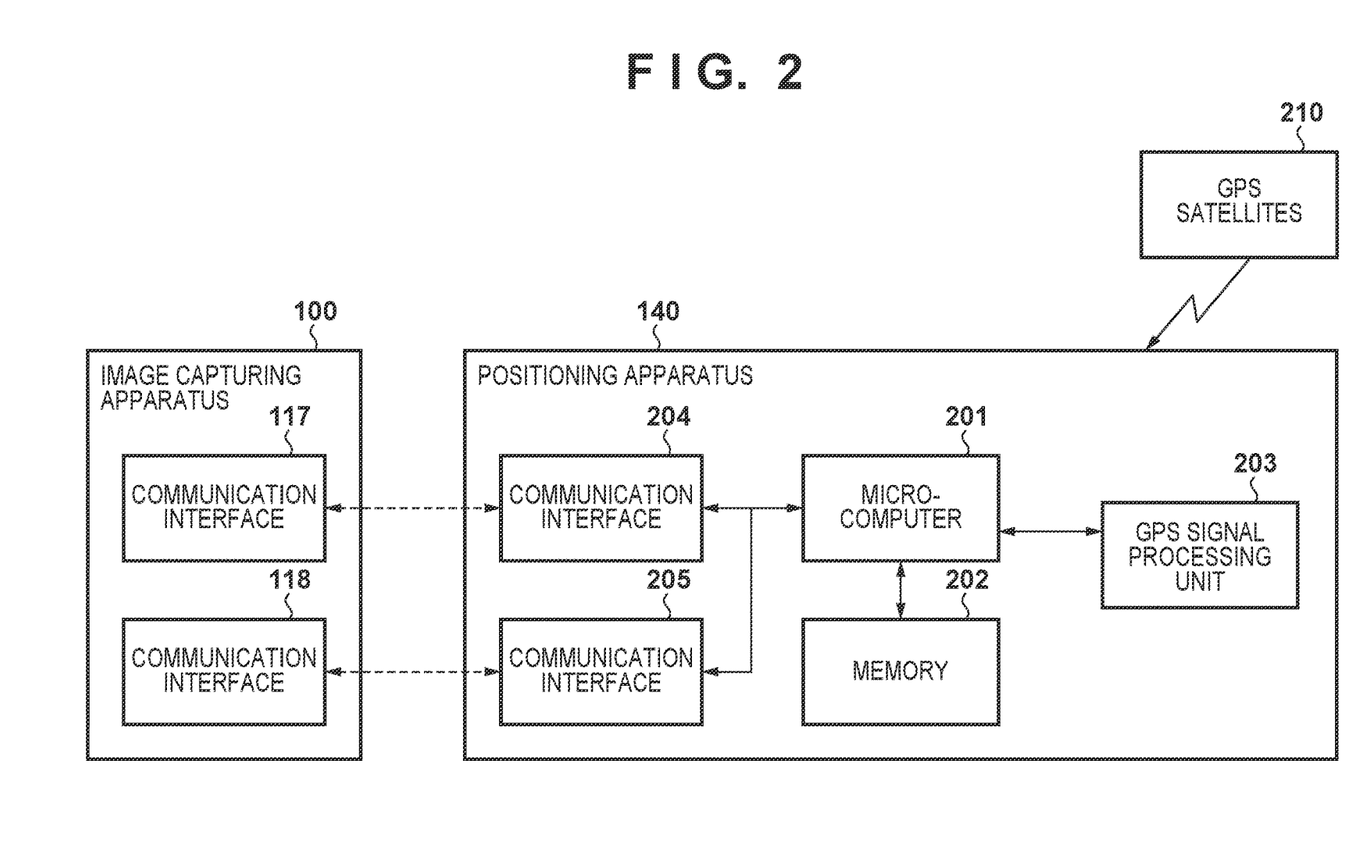
FIG. 2 is a block diagram illustrating a configuration of a positioning apparatus 140.

FIG. 2 is a block diagram illustrating a configuration of the positioning apparatus 140. The positioning apparatus 140 includes a microcomputer 201 and a memory 202. A GPS signal processing unit 203 calculates position information of the positioning apparatus 140 from GPS signals that have been received from GPS satellites 210, and stores the position information in the memory 202. Communication interfaces 204 and 205 communicate with the image capturing apparatus 100 by wire or wirelessly via the communication interfaces 117 and 118 of the image capturing apparatus 100.

In the following description, the communication interface 117 of the image capturing apparatus 100 is assumed to communicate with the communication interface 204 of the positioning apparatus 140 using Bluetooth Low Energy (BLE). Also, the communication interface 118 of the image capturing apparatus 100 is assumed to communicate with the communication interface 205 of the positioning apparatus 140 using WiFi. However, the communication method of the communication interfaces 117 and 118 and the communication interfaces 204 and 205 are not limited thereto, and an arbitrary communication method can be adopted. Also, the communication method between the communication interface 117 and the communication interface 204 may be the same as the communication method between the communication interface 118 and the communication interface 205. In this case, in handover that will be described later with reference to FIG. 4, switching from BLE connection between the communication interface 117 and the communication interface 204 to BLE connection between the communication interface 118 and the communication interface 205 is performed, for example.

The processing executed by the image capturing apparatus 100 and the positioning apparatus 140 will be described with reference to FIG. 3. In step S301, the microcomputer 201 starts processing for connecting to the image capturing apparatus 100 with BLE via the communication interface 204. In step S302, the microcomputer 123 broadcasts an advertising signal. In step S303, in response to the advertising signal broadcasted by the image capturing apparatus 100 in step S302, the microcomputer 201 transmits a connection request to the image capturing apparatus 100. Note that, in the case where there are a plurality of image capturing apparatuses in the periphery of the positioning apparatus 140, and the image capturing apparatuses each broadcast an advertising signal, a screen for notifying the presence of the image capturing apparatuses is displayed in a display unit (unshown) of the positioning apparatus 140. A user can select which of the image capturing apparatuses the positioning apparatus 140 is to be connected to using this screen. The positioning apparatus 140, upon accepting the user selection, transmits the connection request to the selected image capturing apparatus. If the image capturing apparatus 100 accepts the connection request, BLE connection is established in step S304.

In step S305, the GPS signal processing unit 203 receives GPS signals from the GPS satellites 210, and calculates position information based on the GPS signals. The microcomputer 201 transmits the position information calculated by the GPS signal processing unit 203 to the image capturing apparatus 100 via BLE connection. In step S306, the microcomputer 123 stores the position information received from the positioning apparatus 140 in the buffer memory 122 via the memory controller 119.

In step S307, the microcomputer 123 starts shooting an object in response to the switches SW1 and SW2 being turned on by a user. In step S308, the microcomputer 123 captures the object using the image sensor 112, and generates an image of the object using the video signal processing circuit 116. The microcomputer 123 stores the generated image in the buffer memory 122 via the memory controller 119. In step S309, the microcomputer 123 reads out the position information from the buffer memory 122, and outputs the position information to the memory controller 119. In step S310, the microcomputer 123 adds the position information read out from the buffer memory 122 to the object image stored in the buffer memory 122. Accordingly, the image is associated with the position information. The microcomputer 123 stores the image to which the position information is added (position information-added image) in the buffer memory 122 via the memory controller 119. In step S311, the microcomputer 123 saves the position information-added image stored in the buffer memory 122 in the memory 120 via the memory controller 119. According to the processing described above, the position information received from the positioning apparatus 140 can be added to an image captured by the image capturing apparatus 100.

Next, the processing when the positioning apparatus 140 receives an instruction from the user to disconnect BLE connection will be described. When the positioning apparatus 140 receives an instruction from the user to disconnect BLE connection, in step S312, the microcomputer 201 starts processing for disconnecting BLE connection with the image capturing apparatus 100. In step S313, the microcomputer 123 deletes the position information (position information received from the positioning apparatus 140) stored in the buffer memory 122. In step S314, the microcomputer 123 disconnects BLE connection with the positioning apparatus 140. According to the processing described above, the position information received from the positioning apparatus 140 before disconnection is not added to an image captured by the image capturing apparatus 100 after BLE connection is disconnected. When the user instructs disconnection of BLE connection, it is possible that, thereafter, the image capturing apparatus 100 has moved, and the position information before disconnection is no longer valid. As a result of deleting the position information from the buffer memory 122 when BLE connection is disconnected, invalid position information can be prevented from being added to the image.

Note that, in the above description, the processing for disconnecting BLE connection is assumed to be initiated in response to the disconnection instruction from the user. However, the present embodiment is not limited thereto, and the microcomputer 123 may delete the position information from the buffer memory 122 when BLE connection is disconnected due to another cause as well. For example, when the image capturing apparatus 100 moves out of the communicable range with the positioning apparatus 140, and as a result, BLE connection is disconnected, the microcomputer 123 deletes the position information from the buffer memory 122.

Next, the processing (when handover is performed) executed by the image capturing apparatus 100 and the positioning apparatus 140 will be described with reference to FIG. 4. In FIG. 4, steps that are for performing processing the same as or similar to steps as in FIG. 3 have been given the same reference signs as those in FIG. 3. After BLE connection is established and the position information has been stored in the buffer memory 122 as a result of performing the processing in steps S301 to S306, when the positioning apparatus 140 receives an instruction to switch connection from the user, the processing in step S401 is executed. Here the instruction to switch connection is assumed to be an instruction to perform processing for switching (handover) from BLE connection to WiFi connection using communication parameters (such as SSID and password) that the positioning apparatus 140 has been notified of by the image capturing apparatus 100 via BLE connection. However, the instruction to switch connection of the present embodiment is not limited to the instruction to perform handover. An arbitrary instruction to switch connection can be adopted as long as the processing for disconnecting the current connection and the processing for establishing a new connection are executed in response to the instruction to switch connection, and it is not essential to make notification of the communication parameters for the new connection via the current connection.

In step S401, the microcomputer 201 starts processing (handover) for switching from BLE connection to WiFi connection. Specifically, the microcomputer 201 transmits information indicating that handover is to be initiated to the image capturing apparatus 100 via BLE connection. In step S402, the microcomputer 123 transmits communication parameters (such as SSID and password) for WiFi connection to the positioning apparatus 140 via BLE connection. In step S312, the microcomputer 201 starts processing for disconnecting BLE connection with the image capturing apparatus 100.

In step S403, the microcomputer 123 determines whether or not the disconnection of BLE connection is due to the instruction to switch connection (handover). This determination is performed based on whether or not the microcomputer 123 has received information indicating that handover is to be initiated from the positioning apparatus 140 in step S401. If this information has been received, the microcomputer 123 advances the processing to step S314 without deleting the position information (position information received from the positioning apparatus 140) stored in the buffer memory 122. If not, the microcomputer 123 deletes the position information stored in the buffer memory 122 in step S313. In step S314, the microcomputer 123 disconnects BLE connection with the positioning apparatus 140.

According to the processing described above, even if BLE connection was disconnected, if the disconnection was caused by handover, the position information is not deleted. Therefore, the microcomputer 123 can add the position information that was received from the positioning apparatus 140 before the disconnection of BLE connection to an image captured after disconnection.

Subsequently, in step S404, the microcomputer 201 initiates WiFi connection using the communication parameters (such as SSID and password) received from the image capturing apparatus 100 via BLE connection in step S402. In step S405, the microcomputer 123 performs WiFi connection using the communication parameters that were transmitted to the positioning apparatus 140 via BLE connection in step S402. Note that, in the present embodiment, the microcomputer 123 generates a WiFi network by transmitting a beacon including SSID that was transmitted to the positioning apparatus 140 via BLE connection. Then, as a result of the microcomputer 201 performing processing for participating in this network, WiFi connection via the communication interface 118 of the image capturing apparatus 100 and the communication interface 205 of the positioning apparatus 140 is established. WiFi connection is established in step S406, and the handover is completed in step S407.

Figure 3:
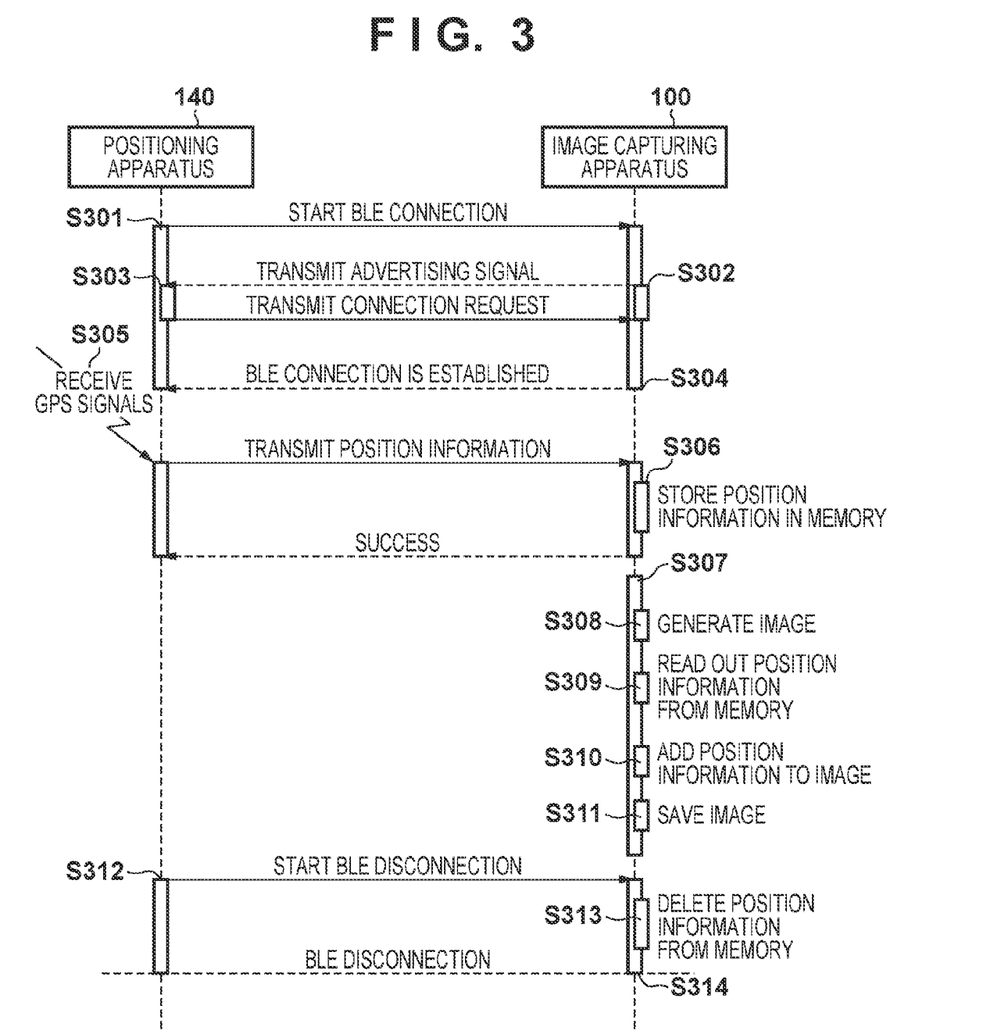
FIG. 3 is a sequence diagram of processing executed by the image capturing apparatus 100 and the positioning apparatus 140.
Figure 4:
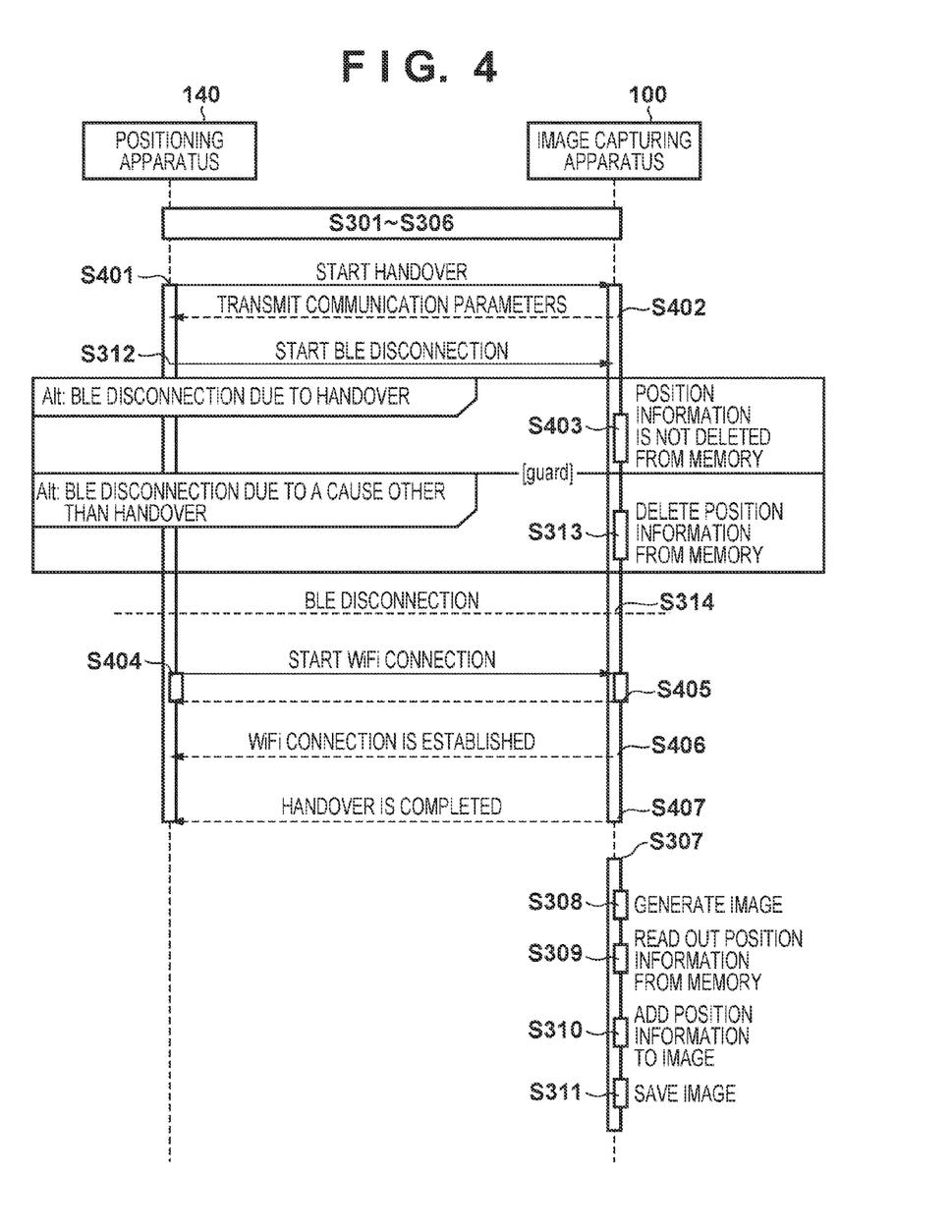
FIG. 4 is a sequence diagram of processing (in the case where handover is performed) executed by the image capturing apparatus 100 and the positioning apparatus 140.

The processing in steps S307 to S311 is similar to the processing in steps S307 to S311 in FIG. 3. That is, the microcomputer 123 captures an image, and adds the position information that was received from the positioning apparatus 140 before BLE connection was disconnected to the image. Note that, if the disconnection of BLE connection was not caused by handover (that is, if the processing in step S313 is executed), the processing in steps S309 and S310 is not executed, and position information is not added to the image.

Note that, in the case where the image capturing apparatus 100 and the positioning apparatus 140 are mutually registered as BLE connection partners, when BLE communication becomes available, the image capturing apparatus 100 and the positioning apparatus 140 try to connect to each other. Therefore, if WiFi connection is disconnected after handover, for example, BLE connection between the image capturing apparatus 100 and the positioning apparatus 140 is automatically re-established. Accordingly, even in a case where WiFi connection is disconnected after handover, the microcomputer 123 keeps the position information without deleting it from the buffer memory 122.

As described above, according to the first embodiment, the image capturing apparatus 100 acquires position information from the positioning apparatus 140 via BLE connection, and stores the position information in the buffer memory 122. When BLE connection is disconnected, the image capturing apparatus 100 deletes the position information from the buffer memory 122, but if the disconnection is due to the instruction to switch connection, the position information is not deleted. Therefore, according to the present embodiment, in a communication apparatus that can acquire position information from a positioning apparatus, the position information acquired in the past can be appropriately handled when the communication connection for acquiring the position information is disconnected.

Note that the application of the position information stored in the buffer memory 122 is not limited to that of being added to an image. For example, in the case where the communication apparatus of the present embodiment is applied to a personal computer (PC) in which a maps application has been installed, the position information stored in the buffer memory 122 can be used to indicate the current position on a map.

Second Embodiment

In a second embodiment, a configuration will be described in which, even if BLE connection was disconnected due to the instruction to switch connection, the image capturing apparatus 100 deletes the position information, if the communication method of position information changes. In the second embodiment, the basic configurations of the image capturing apparatus 100 and the positioning apparatus 140 are similar to those in the first embodiment. Hereinafter, the differences from the first embodiment will mainly be described.

Figure 5:
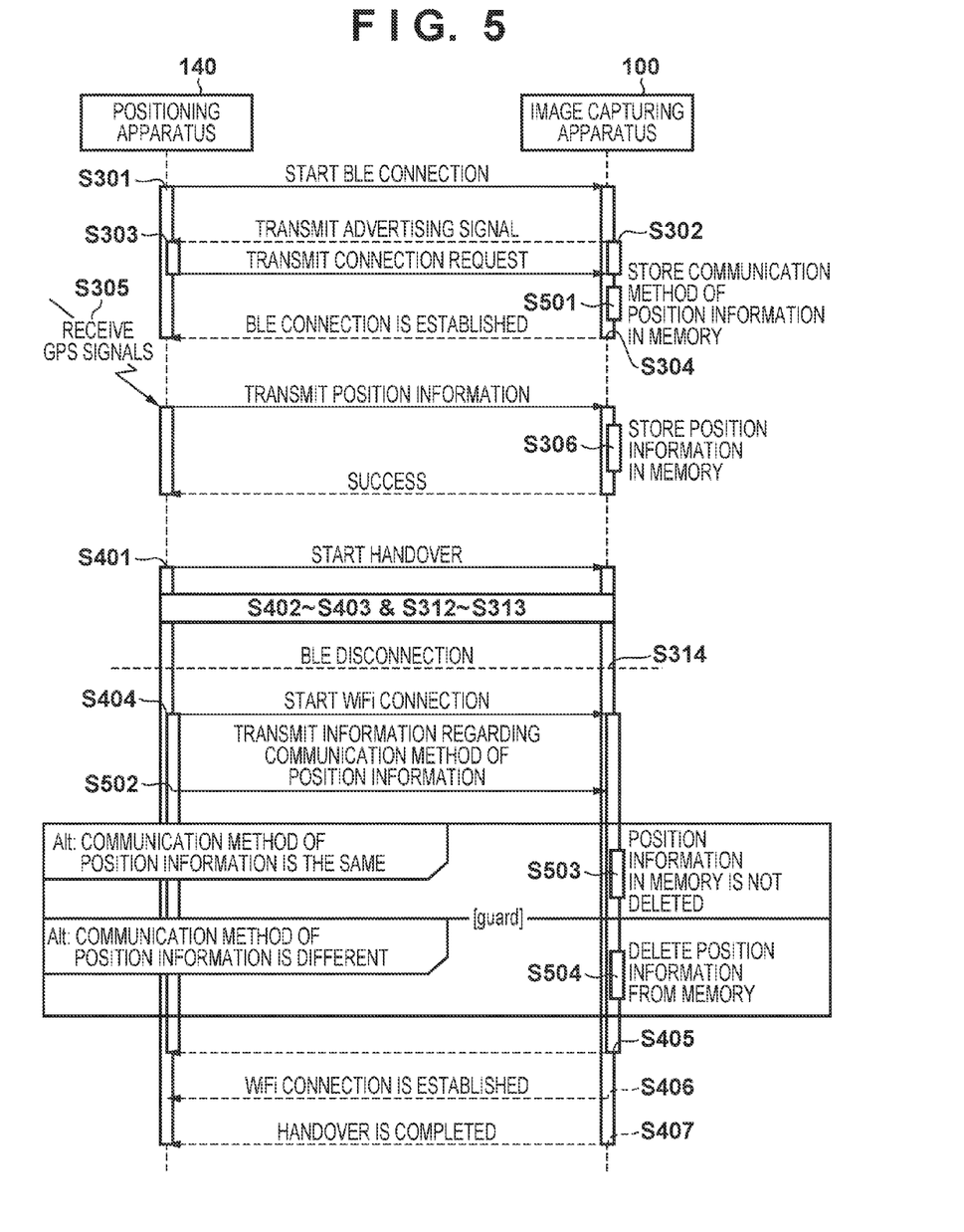
FIG. 5 is a sequence diagram of processing (in the case where position information is deleted depending on the communication method of position information) executed by the image capturing apparatus 100 and the positioning apparatus 140.

The processing (in which whether or not the position information is deleted is determined depending on the communication method of position information) executed by the image capturing apparatus 100 and the positioning apparatus 140 will be described with reference to FIG. 5. In FIG. 5, steps that are for performing processing the same as or similar to steps as in FIGS. 3 and 4 have been given the same reference signs as those in FIGS. 3 and 4. The processing in steps S301 to S306 is similar to the processing in steps S301 to S306 in the first embodiment, and step S501 is added between step S303 and step S304.

In step S501, the microcomputer 123 stores the communication method of position information of the positioning apparatus 140 in the buffer memory 122. The information indicating the communication method of position information is included in the connection request in step S303, for example. The communication method of position information is a push method or a pull method, for example. In the case of the push method, the positioning apparatus 140 transmits the position information to the image capturing apparatus 100 at the timing when the positioning apparatus 140 has received the GPS signals from the GPS satellites 210 and has calculated the position information. In the case of this method, the image capturing apparatus 100 uses the received position information until the image capturing apparatus 100 receives the next new position information. In the case of the pull method, the image capturing apparatus 100 requests the positioning apparatus 140 to acquire the position information at the timing when the image capturing apparatus 100 uses the position information, and the positioning apparatus 140 transmits the position information to the image capturing apparatus 100 in response to the request. In this method, the image capturing apparatus 100 requests the position information to the positioning apparatus 140 at the timing when a shooting instruction is received, for example.

After WiFi connection is started in step S404, the microcomputer 201 transmits, in step S502, information regarding the communication method of position information in WiFi connection to the image capturing apparatus 100. In step S503, the microcomputer 123 determines whether or not the communication method of position information in WiFi connection is the same as the communication method of position information in BLE connection (communication method stored in the buffer memory 122 in step S501). If the microcomputer 123 determines that the communication method is the same, the microcomputer 123 advances the processing to step S405 without deleting the position information (position information received from the positioning apparatus 140 via BLE connection) stored in the buffer memory 122. If not, the microcomputer 123 deletes the position information stored in the buffer memory 122 in step S504. The processing thereafter is similar to the processing in the first embodiment (refer to steps S307 to S311 in FIG. 4). Note that, if the communication method of position information is different between BLE connection and WiFi connection (that is, if the processing in step S504 is executed), the processing in steps S309 and S310 is not executed, and position information is not added to an image.

According to the processing described above, if the communication method of position information is the same before and after handover, the position information received from the positioning apparatus 140 before the handover can be added to an image captured by the image capturing apparatus 100 after the handover. If the communication method of position information differs before and after handover, the position information received from the positioning apparatus 140 before the handover is no longer added to an image captured by the image capturing apparatus 100 after the handover.

Other Embodiments

In the first and second embodiments, if BLE connection is disconnected due to a cause other than handover, the image capturing apparatus 100 immediately deletes the position information. In this regard, the image capturing apparatus 100 may set a predetermined period as the valid period of position information, and delete the position information when the predetermined period has elapsed, for example. That is, if BLE connection is disconnected due to a cause other than handover, the image capturing apparatus 100 starts measuring the valid period, and deletes the position information after the predetermined period has elapsed. The reason why this procedure is taken is that it is conceivable that the disconnection of BLE connection is a temporary disconnection due to a simple communication failure. In such a case, it is possible that the communication will return to a normal state instantly, and therefore, the image capturing apparatus 100 keeps the position information. However, if the communication does not return to a normal state for a long period of time, the user may have moved, and therefore, the setting of the valid period can reduce the possibility of using inaccurate position information. Accordingly, the availability of the position information can be increased while also reducing the possibility of using inaccurate position information.

Also, even if BLE connection was disconnected due to handover, the user may move during WiFi connection. However, the possibility of the user moving is considered to be lower than when the disconnection is due to a cause other than handover. Therefore, the image capturing apparatus 100 sets a valid period, when BLE connection is disconnected due to handover, that is longer than that when BLE connection is disconnected due to a cause other than handover. Accordingly, the possibility of using inaccurate information when the user moves during WiFi connection can be reduced.

Also, the image capturing processing in the image capturing apparatus 100 consumes more power than the power for maintaining BLE connection. That is, when the remaining battery of the image capturing apparatus 100 is low, there are cases where an image cannot be captured even if BLE connection continues. In this case, image capturing using the position information is impossible, and therefore, the image capturing apparatus 100 does not store the position information even if BLE connection continues.

Also, an application that includes a function of establishing BLE connection and WiFi connection with the image capturing apparatus 100 and a function of transmitting position information to the image capturing apparatus 100 is installed in the positioning apparatus 140 described above. In the positioning apparatus 140, handover processing with the image capturing apparatus 100 and transmission of position information are realized under the control of this application. Therefore, when the function of transmitting position information is set to off by a user operation to the application, for example, the positioning apparatus 140 notifies the image capturing apparatus 100 thereof, and the image capturing apparatus 100 deletes the held position information. Also, when the application ends, the positioning apparatus 140 notifies the image capturing apparatus 100 thereof as well, and the image capturing apparatus 100 deletes the held position information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-140805, filed Jul. 15, 2016, which is hereby incorporated by reference herein in its entirety.

What is claimed is:

1. A communication apparatus including a first communication unit and a second communication unit, comprising:
   an acquiring unit configured to acquire, while a first connection with a positioning apparatus is established via the first communication unit, position information from the positioning apparatus via the first connection;
   a storing unit configured to store the acquired position information in a memory;
   a switching unit configured to execute, in response to an instruction to switch connection, processing for disconnecting the first connection and processing for establishing a second connection with the positioning apparatus via the second communication unit; and
   a deleting unit configured to delete the position information from the memory in response to the first connection being disconnected, wherein the deleting unit does not delete the position information when the disconnection is due to the instruction to switch connection.

2. The communication apparatus according to claim 1, wherein the switching unit is configured to transmit a communication parameter for establishing the second connection to the positioning apparatus via the first connection.

3. The communication apparatus according to claim 1, wherein the first communication unit conforms to USB, WiFi, Bluetooth, or Bluetooth Low Energy (BLE).

4. The communication apparatus according to claim 1, wherein the second communication unit conforms to USB, WiFi, Bluetooth, or Bluetooth Low Energy (BLE).

5. The communication apparatus according to claim 1, wherein the deleting unit is configured to delete the position information from the memory in response to the first connection being disconnected and a first period having been elapsed since the disconnection.

6. The communication apparatus according to claim 5, wherein the deleting unit is configured to, even if the disconnection of the first connection was due to the instruction to switch connection, delete the position information from the memory in response to a second period that is longer than the first period having been elapsed since the disconnection.

7. An image capturing apparatus including a first communication unit and a second communication unit, comprising:
   an acquiring unit configured to acquire, while a first connection with a positioning apparatus is established via the first communication unit, position information from the positioning apparatus via the first connection;
   a storing unit configured to store the acquired position information in a memory;
   a switching unit configured to execute, in response to an instruction to switch connection, processing for disconnecting the first connection and processing for establishing a second connection with the positioning apparatus via the second communication unit;
   a deleting unit configured to delete the position information from the memory in response to the first connection being disconnected, wherein the deleting unit does not delete the position information when the disconnection is due to the instruction to switch connection; and
   an image capturing unit.

8. The image capturing apparatus according to claim 7, further comprising an association unit configured to associate an image generated by the image capturing unit with the position information stored in the memory.

9. A control method executed by a communication apparatus including a first communication unit and a second communication unit, comprising:
   acquiring, while a first connection with a positioning apparatus is established via the first communication unit, position information from the positioning apparatus via the first connection;
   storing the acquired position information in a memory;
   executing, in response to an instruction to switch connection, processing for disconnecting the first connection and processing for establishing a second connection with the positioning apparatus via the second communication unit; and
   deleting the position information from the memory in response to the first connection being disconnected, wherein the position information is not deleted when the disconnection is due to the instruction to switch connection.

10. A non-transitory computer-readable storage medium which stores a program for causing a computer of a communication apparatus to execute a control method, the communication apparatus including a first communication unit and a second communication unit, the control method comprising:
   acquiring, while a first connection with a positioning apparatus is established via the first communication unit, position information from the positioning apparatus via the first connection;
   storing the acquired position information in a memory;
   executing, in response to an instruction to switch connection, processing for disconnecting the first connection and processing for establishing a second connection with the positioning apparatus via the second communication unit; and
   deleting the position information from the memory in response to the first connection being disconnected, wherein the position information is not deleted when the disconnection is due to the instruction to switch connection.

* * * * *